(12) United States Patent
Borzakian et al.

(10) Patent No.: US 8,092,183 B2
(45) Date of Patent: Jan. 10, 2012

(54) FAN ROTOR FOR A TURBOMACHINE OR A TEST ENGINE

(75) Inventors: Muriel Jane Sylvie Borzakian, Saint German les Corbeil (FR); Aymeric Hugonie, Itteville (FR)

(73) Assignee: Snecma, Paris (FR)

( * ) Notice: Subject to any disclaimer, the term of this patent is extended or adjusted under 35 U.S.C. 154(b) by 452 days.

(21) Appl. No.: 12/427,343

(22) Filed: Apr. 21, 2009

(65) Prior Publication Data
US 2009/0269202 A1    Oct. 29, 2009

(30) Foreign Application Priority Data
Apr. 24, 2008   (FR) ...................................... 08 02294

(51) Int. Cl.
*B63H 1/20* (2006.01)
*B63H 13/00* (2006.01)
(52) U.S. Cl. ................. 416/220 R; 416/219 R
(58) Field of Classification Search ............... 416/220 R, 416/219 R
See application file for complete search history.

(56) References Cited

U.S. PATENT DOCUMENTS

| | | | | |
|---|---|---|---|---|
| 4,405,285 | A * | 9/1983 | Surdi | 416/220 R |
| 4,470,756 | A * | 9/1984 | Rigo et al. | 416/220 R |
| 4,478,554 | A * | 10/1984 | Surdi | 416/221 |
| 4,502,841 | A * | 3/1985 | Kebedjis | 416/220 R |
| 5,749,706 | A * | 5/1998 | Maar | 416/220 R |
| 6,416,280 | B1 * | 7/2002 | Forrester et al. | 416/94 |
| 7,165,944 | B2 * | 1/2007 | Gautreau et al. | 416/219 R |

FOREIGN PATENT DOCUMENTS

| | | |
|---|---|---|
| EP | 1 223 309 A1 | 7/2002 |
| FR | 2 814 495 A1 | 3/2002 |
| GB | 2 436 132 A | 9/2007 |

* cited by examiner

*Primary Examiner* — Nitin Parekh
(74) *Attorney, Agent, or Firm* — Oblon, Spivak, McClelland, Maier & Neustadt, L.L.P.

(57) ABSTRACT

A fan rotor, in particular for a turbomachine, the rotor comprising a disk carrying blades having roots engaged in substantially axial grooves in the outer periphery of the disk, a substantially frustoconical annular spinner mounted on the disk upstream from the blades, and axial retention means for retaining the blades on the disk in the upstream direction, which retention means are formed integrally with the spinner.

9 Claims, 3 Drawing Sheets

FAN ROTOR FOR A TURBOMACHINE OR A TEST ENGINE

FIELD OF THE INVENTION

The present invention relates to a fan rotor for a test engine or a turbomachine such as an airplane turbojet or turboprop.

BACKGROUND OF THE INVENTION

A turbomachine fan comprises a disk carrying fan blades at its outer periphery, these blades having roots that are engaged in substantially axial grooves in the outer periphery of the disk. The fan blades are held radially on the disk by co-operation between the shapes of their roots and of the disk grooves, the blade roots being of the dovetail type, for example. Inter-blade platforms are mounted on the disk between the fan blades.

In the present technique, the blades are held axially on the disk in the upstream direction by means that are mounted on the disk both upstream and downstream from the blades, thereby preventing the blade roots from moving axially in the disk grooves.

The retaining means situated downstream from the blades comprise at least one hook that is engaged in notches machined in the downstream end portions of the blade roots.

The retaining means situated upstream comprise a ring and an annular web that are fitted on the upstream end of the disk and fastened thereto. The ring is mounted coaxially on the disk and includes a scalloped portion co-operating with a corresponding scalloped portion of the disk. The web is mounted coaxially on the disk to block the ring axially on the disk. The outer periphery of the web bears axially against the blade roots so as to retain them axially in the upstream direction, the inner periphery thereof being pressed against a corresponding annular flange of the disk and being fastened thereto. The outer periphery of the web further includes pegs fastening the upstream ends of the inter-blade platforms.

An annular spinner of substantially frustoconical shape is mounted on the disk, upstream from the blades, and it defines the inside of the annular passage for air entry into the turbomachine. In the vicinity of its downstream end, the spinner has a radially inner flange that is pressed axially against the above-mentioned web and that is fastened to the web on the flange of the disk by screw-and-nut type means.

In the fortunately relatively rare circumstance of a fan blade being lost or broken, the blade strikes against an adjacent fan blade, which is then subjected to a very violent axial force in the upstream direction. The means for retaining the fan blades axially are designed to damp at least a fraction of this axial force by presenting "double flexibility" that enables the other blades of the fan to be retained axially.

The first flexibility is provided by the upstream retaining means that are designed to deform plastically under the effect of the above-mentioned axial force. The second flexibility is formed by the downstream retaining means that are designed to come into abutment against the downstream ends of the blade roots when the plastic deformation of the upstream retaining means has reached a certain threshold. This double flexibility is essential to enable the parts of the fan to hold together in the event of a blade being lost or broken.

Nevertheless, the means that provide this double flexibility present drawbacks, since they comprise a large number of parts: a ring, a web, and the spinner having a flange that is used for fastening the web to the disk, for the upstream retaining means; and a hook co-operating with notches in the blade root for the downstream retaining means. Furthermore, they are bulky and cannot be mounted on a fan of small diameter. The technology for fastening inter-blade platforms to the disk by means of pegs provided on the web is likewise not possible for lack of space in a fan of small diameter. Furthermore, the blade roots need to be machined at their downstream ends in order to form the notches therein for co-operating with the downstream hooks. The materials that can be used for the fan blade are therefore restricted to materials that can be machined.

Finally, on certain turbomachine engines such as test engines, the fan is fitted with a remote measurement system that comprises a sheath extending axially inside the fan disk and including at its upstream end an annular flange for fastening to the disk flange. It is then no longer possible to fasten the spinner flange to said disk flange.

OBJECT AND SUMMARY OF THE INVENTION

A particular object of the invention is to provide a solution to those problems of the prior art, that is simple, effective, and inexpensive, by proposing axial retaining means for the fan blades that are simpler, more compact, and lighter in weight than those of the prior art.

For this purpose, the invention provides a fan rotor, in particular for a turbomachine, the rotor comprising a disk carrying blades having roots that are engaged in substantially axial grooves in the outer periphery of the disk, and a substantially frustoconical annular spinner mounted by jaw-clutching on the disk, upstream from the blades, the spinner having a substantially radial inner annular rim that is scalloped or crenellated and that comprises solid portions alternating with gap portions and that, in the assembled position, is received in an outer annular groove of the disk that is defined upstream by a substantially radial outer annular rim that is scalloped or crenellated, wherein the rim of the spinner is connected at its outer periphery to a substantially cylindrical wall that is designed to deform in the event of a fan blade being broken or lost, and wherein the gap portions in the annular rim of the spinner include substantially radial notches for increasing the flexibility in bending of the solid portions of said rim.

The invention makes it possible to omit the ring and the web of the prior art, thereby simplifying and lightening the blade retention means. These retention means are compact, thus enabling them to be used in a fan of small diameter (e.g. about 31.5 inches). They are located solely upstream from the blades and no longer both upstream and downstream as in the prior art, thereby making it possible to omit the downstream hook of the prior art. There is no longer any need to machine the blade roots in order to mount the hook, so the blades may be made of any type of material, including lightweight materials that are difficult to machine, such as composite materials.

According to a characteristic of the invention, the retaining means comprise a substantially radial inner annular rim that, in the mounted position, is received in an outer annular groove of the disk. The annular rim bears against the upstream end of the blade roots in order to retain them axially in the upstream direction.

The annular rim of the spinner is scalloped or crenellated and comprises solid portions that alternate with gap portions. The annular groove of the disk is defined upstream by a substantially radial outer annular rim that is scalloped or crenellated, the annular rim of the disk comprising solid portions alternating with gap portions of shapes that are substantially complementary to the shapes of the rim of the spinner so as to allow the spinner to be put into place and removed by being moved in axial translation.

In order to put the annular spinner into place on the disk, the spinner is initially positioned angularly upstream from the disk so that the solid portions of the rim of the spinner are in axial alignment with the gap portions in the rim of the disk. The spinner is then moved in axial translation towards the disk until the rim of the spinner is received in the annular groove of the disk. The spinner is then turned about the axis of rotation of the fan until the solid portions of the rims of the spinner and of the disk are in alignment with one another in an axial direction. The spinner of the invention thus combines the functions of the web and of the ring in the prior art, i.e. respectively bearing axially against the roots of the blades and fastening to the disk by means of a scalloped connection.

The rim of the spinner is connected at its outer periphery to a substantially cylindrical wall that is designed to deform in the event of a fan blade being broken or lost. For this purpose, in the assembled position, residual axial clearance may exist between the annular rims of the disk and of the spinner so as to allow the cylindrical wall to deform.

This deformation constitutes first flexibility for the retaining means of the invention, thereby enabling the axial force associated with the loss of a blade to be damped. During this deformation, the annular rim of the spinner bends at least locally, and its inner periphery is offset a little upstream until it comes into abutment against the annular rim of the disk.

The gap portions of the annular rim of the spinner include substantially radial notches for increasing the flexibility in bending of the solid portions of the rim.

This characteristic serves to provide second flexibility to the retaining means by allowing the solid portions of the rim of the spinner to deform in bending, the outer periphery of the rim of the spinner then shifting upstream a little.

The above-mentioned bending takes place substantially about axes that are tangential to circumferences centered on the axis of rotation of the fan.

Preferably, each inter-blade platform mounted on the disk includes an upstream rim engaged in an annular groove of the spinner that opens out substantially axially in a downstream direction.

The platforms are thus held in position by the spinner and not by the disk and the web, as happens in the prior art.

Screws may be used to fasten the spinner to an annular flange of the disk or to an annular flange of an intermediate shroud fitted on the disk and fastened thereto. These fastener means serve to prevent the spinner from turning relative to the disk once it has been mounted by jaw-clutching on the disk. The spinner fastener screws are preferably engaged in orifices in an upstream radial wall of the spinner.

The intermediate shroud may also serve for fastening balancing flyweights for the purpose of correcting any unbalance of the fan. It is therefore not necessary to pierce the spinner in order to mount the balancing flyweights, as happens in the prior art.

The invention also provides a turbomachine, such as an airplane turbojet or turboprop, including a fan rotor as described above.

The invention also provides a test engine, including a fan rotor of the above-specified type.

Finally, the invention provides a substantially frustoconical annular spinner for a fan rotor as described above, wherein the spinner includes a radial wall at its upstream end and an internal annular rim at its downstream end, the annular rim being scalloped or crenellated, comprising solid portions alternating with gap portions presenting substantially radial notches or recesses, the annular rim being connected to the spinner by a substantially cylindrical wall that is deformable.

The annular rim is connected to the spinner by a substantially cylindrical wall that is deformable. The gap portions of the annular rim of the spinner comprise radial recesses or notches. These characteristics confer double flexibility to the retaining means.

At its downstream end, the spinner preferably includes an annular groove opening out axially away from its flange.

BRIEF DESCRIPTION OF THE DRAWINGS

The invention can be better understood and other details, characteristics, and advantages of the present invention appear more clearly on reading the following description made by way of non-limiting example and with reference to the accompanying drawings, in which.

MORE DETAILED DESCRIPTION

Figure 1:
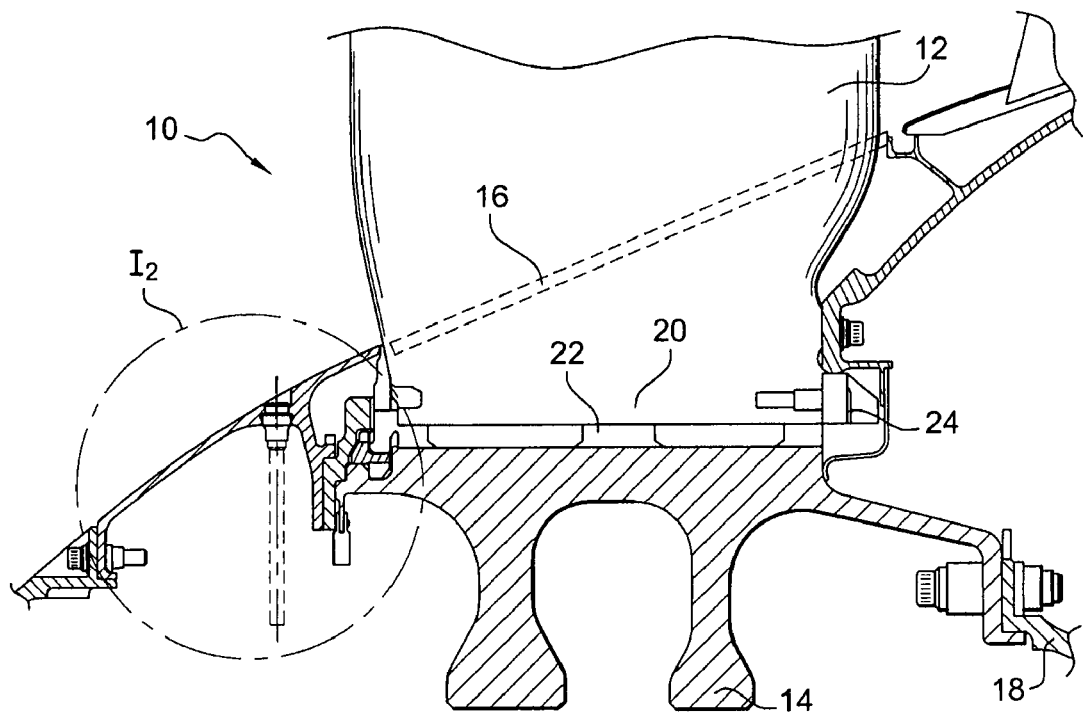
FIG. 1 is a fragmentary diagrammatic half-view in axial section showing a prior art turbomachine fan.
Figure 2:
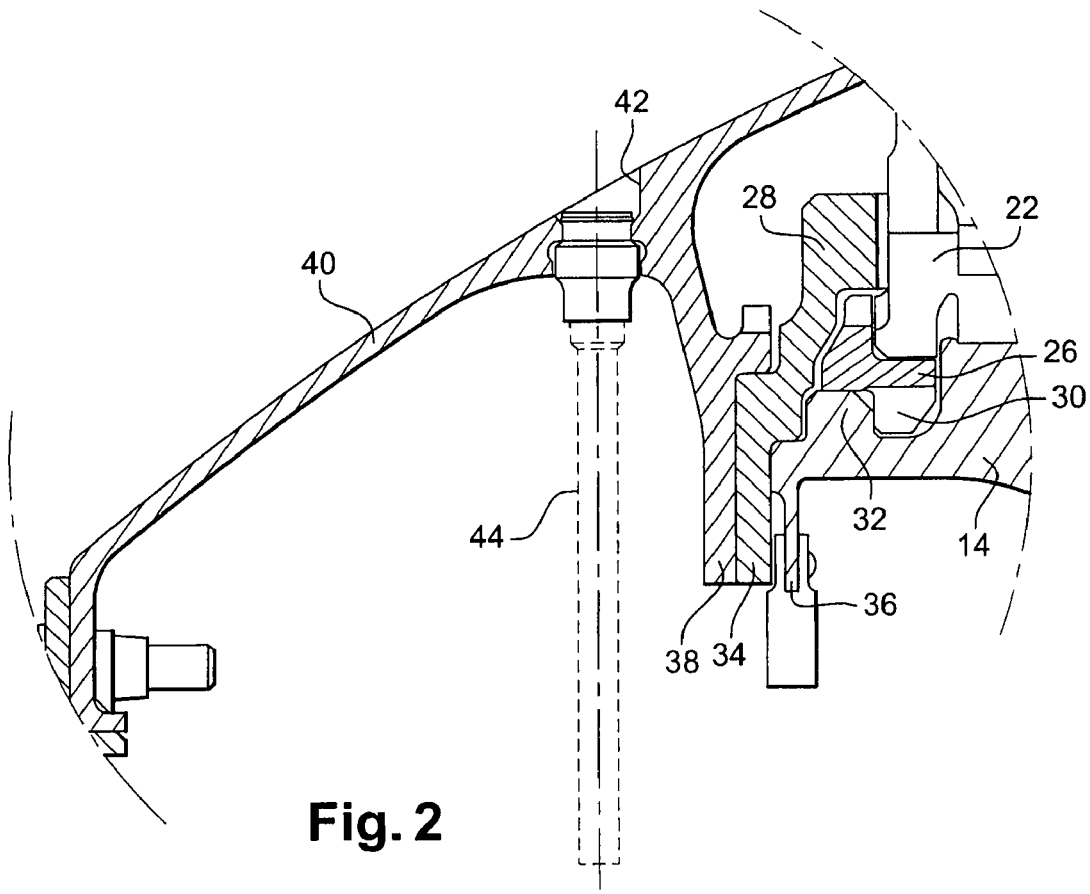
FIG. 2 is a view on a larger scale showing a detail $I_2$ of FIG. 1.
Figure 3:
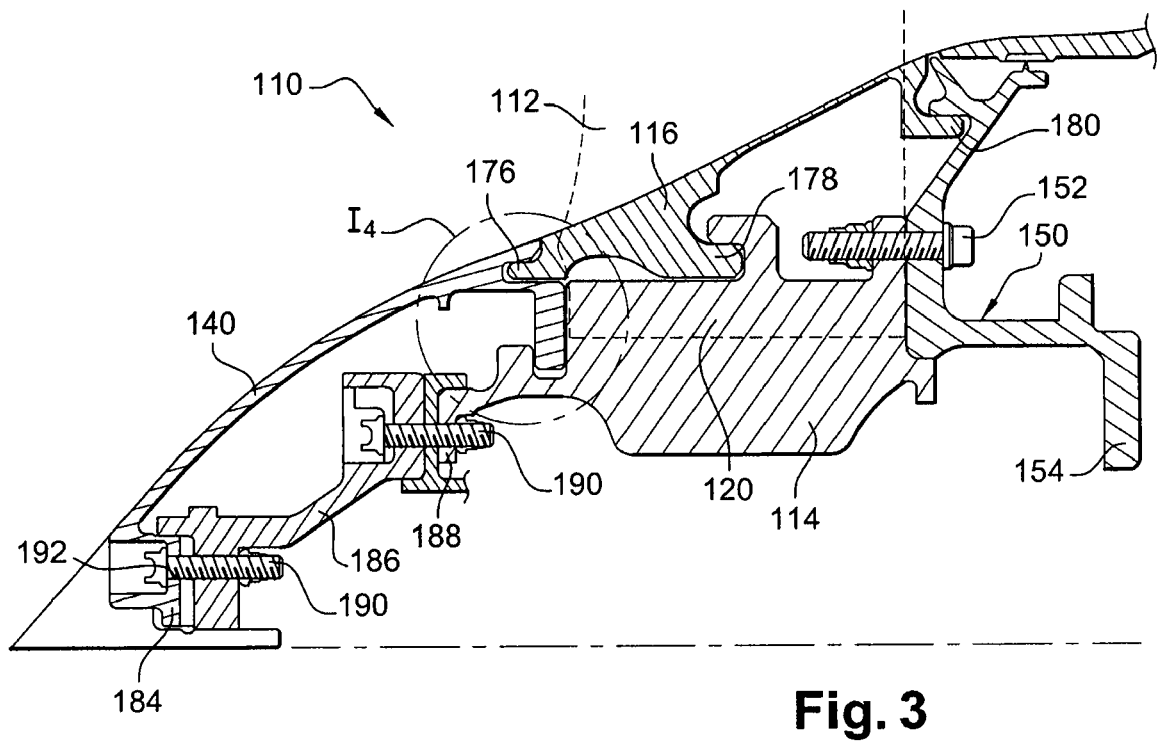
FIG. 3 is a fragmentary diagrammatic half-view in axial section showing a turbomachine fan of the present invention.

Reference is made initially to FIGS. 1 and 2 showing a turbomachine fan 10 forming part of the art prior to the present invention.

The fan 10 comprises blades 12 carried on a disk 14 with inter-blade platforms 16 interposed therebetween, the disk 14 being fastened to the upstream end of a turbomachine shaft 18.

Each fan blade 12 comprises an airfoil connected at its radially inner end to a root 20 that is engaged in a substantially axial groove of complementary shape in the disk 14, thereby enabling the blade to be held radially on the disk. A spacer 22 is interposed between the root 20 of each blade and the bottom of the corresponding groove in the disk in order to prevent the blade from moving radially relative to the disk.

The inter-blade platforms 16 form a wall defining the inside of the passage for the air stream entering the turbomachine, and include means that co-operate with corresponding means provided on the disk 14 between the grooves for the purpose of fastening the platforms to the disk.

The fan blades 12 are retained axially towards their upstream ends in the grooves of the disk 14 by appropriate means mounted on the disk, upstream and downstream from the blades.

The retaining means situated downstream comprise a hook 24 engaged in a notch machined in a downstream end portion of the root 20 of each blade 12, referred to as the heel of the root.

The retaining means located upstream comprise a ring 26 and an annular web 28 that are fitted coaxially to the upstream end of the disk 14 and that are fastened thereto.

The ring 26 has an inner annular rim 30 that is scalloped or crenellated and that co-operates with an outer annular rim 32 of the disk 14 that is crenellated or scalloped, to hold the ring axially in position on the disk. The outer periphery of the ring bears against the spacers 22 for the blade roots 20.

The web 28 lies upstream from the ring 26 and the roots 20 of the fan blade. At its outer periphery, this web has pegs (not shown) for engaging the upstream ends of the inter-blade platforms 16.

The web 28 also has an inner annular flange 34 that is interposed between a corresponding annular flange 36 of the disk 14 and an inner annular flange 38 of a spinner 40 arranged upstream from the fan disk 14. The flanges 34, 36, and 38 have axial orifices for passing screws or the like for clamping the flanges together.

The spinner 40 is generally frustoconical in shape, flaring downstream, with the wall defined between the inter-blade platforms 16 extending the spinner axially. The spinner 40 has radial holes 42 for receiving balancing flyweights 44 mounted therein.

Although such retaining means provide double flexibility in the event of a fan blade 12 being lost, they present the drawbacks described above, and in particular they cannot be used in a fan of relatively small diameter.

The invention enables these drawbacks to be remedied by blade retaining means formed by the frustoconical spinner.

Figure 4:
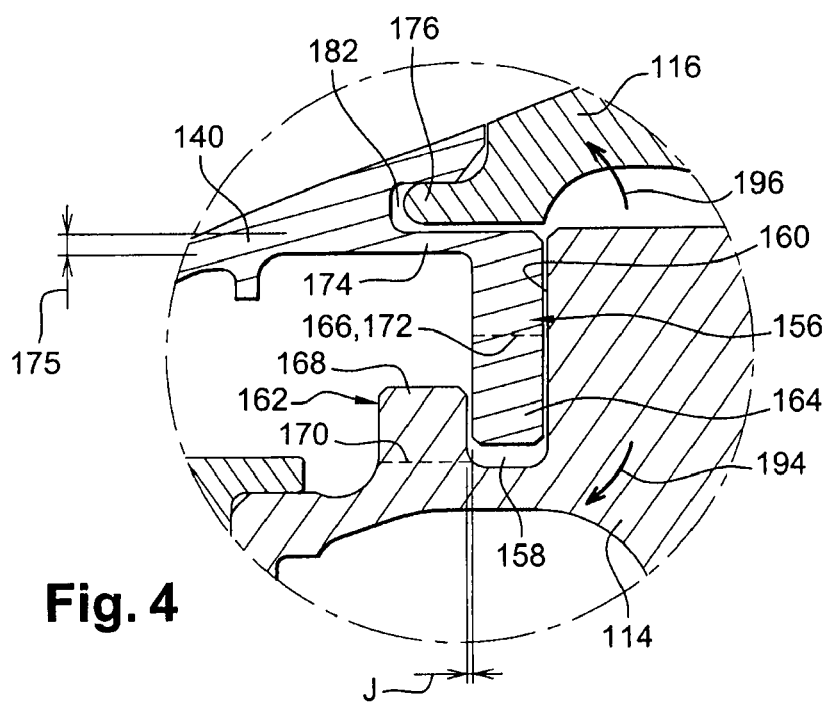
FIG. 4 is an enlarged view showing a detail $I_4$ of FIG. 3.
Figure 5:
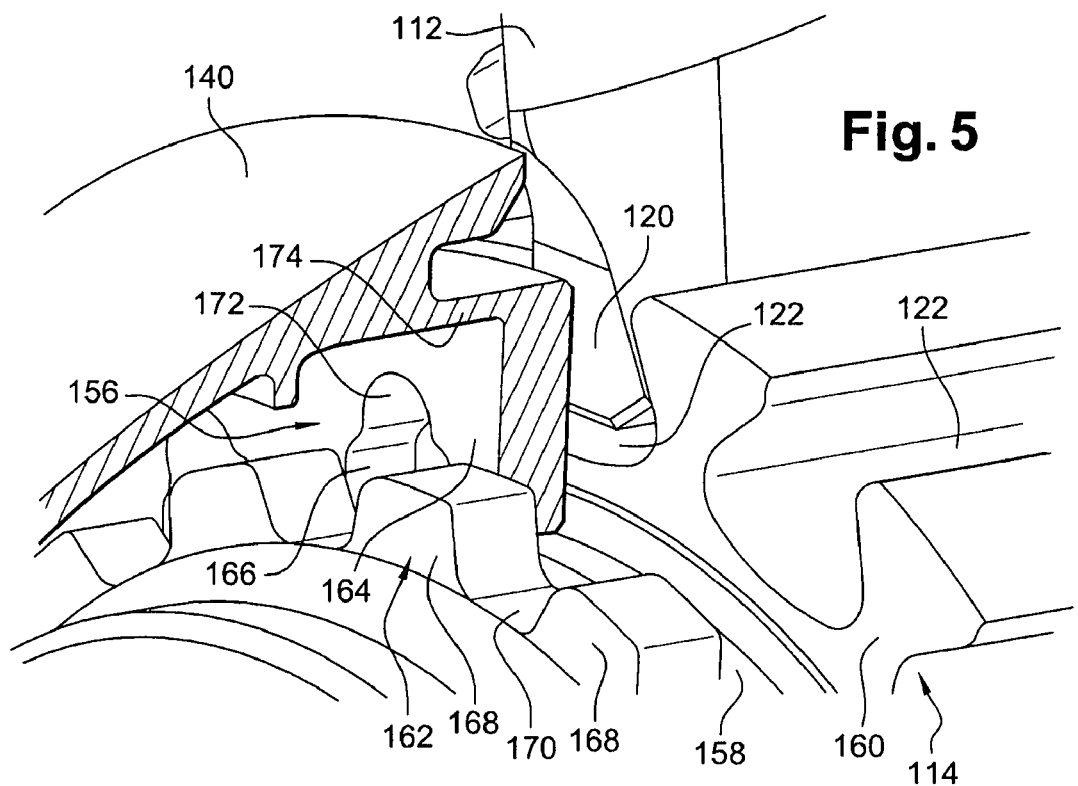
FIG. 5 is a diagrammatic perspective view showing the FIG. 3 fan with the upstream spinner partially cut away.
Figure 6:
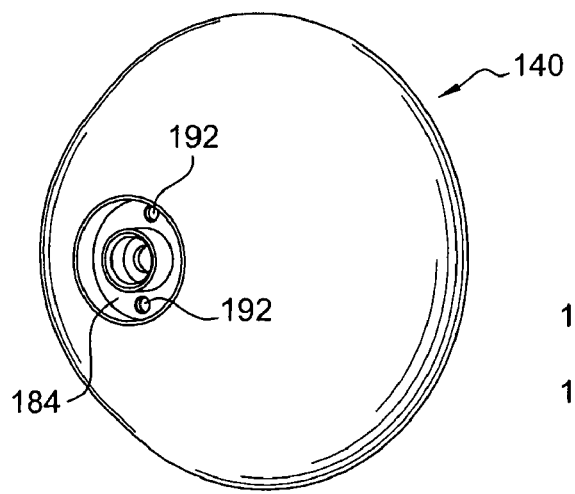
FIGS. 6 and 7 are diagrammatic perspective views on a larger scale showing the upstream spinner of the FIG. 3 fan.
Figure 7:
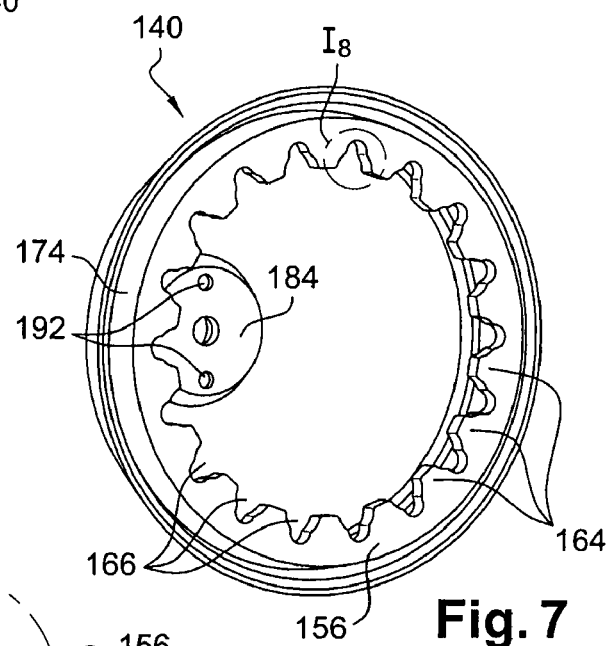
Figure 8:
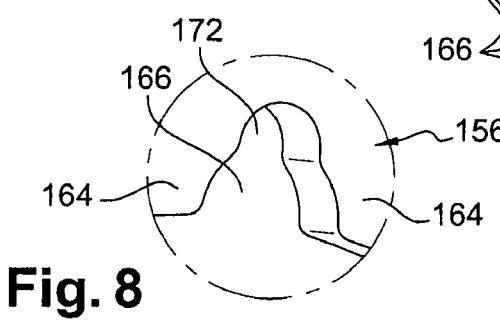
FIG. 8 is a view on a larger scale showing a detail $I_8$ of FIG. 7.

In the embodiment shown in FIGS. 3 to 8, the turbomachine fan 110 may be of a diameter that is smaller than that of the fan in FIGS. 1 and 2, the diameter of the fan 110 being 31.5 inches, for example. At its outer periphery, the fan disk 114 carries blades 112 with inter-blade platforms 116 interposed therebetween. As in the prior art, each blade 112 has a root 120 engaged in a substantially axial groove 122 in the disk 114 and is held radially in said groove by co-operation between shapes (FIG. 5).

The blades 112 are retained axially at the downstream end by bearing against an annular web 150 fitted onto the downstream end of the disk 114 and fastened thereto by screw-and-nut type means 152. The web 150 has an inner annular flange 154 for fastening to the upstream end of a turbomachine shaft.

The blades 112 are retained axially towards their upstream ends by means that are disposed solely upstream from the blades 112, unlike the prior art, and that are formed on an upstream spinner 140. The spinner 140 is substantially frustoconical in shape, flaring downstream and including at its downstream end an annular rim 156 that extends substantially radially inwards and that is received in an outer annular groove 158 of the disk 114.

The groove 158 is defined downstream by an upstream radial face 160 of the disk, and upstream by an annular rim 162 extending substantially radially outwards.

The axial grooves 122 housing the blade roots open out at their upstream ends into the face 160 of the disk, as can be seen in FIG. 5.

The rim 156 of the spinner extends substantially over the entire radial dimension of the upstream face 160 of the disk 114 and can bear axially against said face and the upstream ends of the blade roots 120.

In order to enable the annular rim 156 of the spinner to be mounted in the groove 158 of the disk 114, the annular rims 156 and 162 are scalloped or crenellated, corresponding solid portions 164, 168 that alternate with gap portions 166, 170. The solid portions 164 of the rim 156 of the spinner are substantially complementary in shape to the gap portions 170 in the rim 162 of the disk, and the gap portions 166 of the rim 156 are substantially complementary in shape to the solid portions 168 of the disk 114. The solid portions 164 and 168 are regularly distributed around the axis of the fan.

The spinner 140 is mounted on the disk by jaw-clutching, i.e. it is positioned upstream of the disk 114, then it is turned about the axis of rotation of the fan so that the solid portions 164 of the rim 156 of the spinner are in axial alignment with the gap portions 170 of the rim 162 of the disk 164. The spinner is then moved in axial translation towards the disk until the rim 156 is received in the groove 158 of the disk. Thereafter, the spinner 140 is turned about the axis of the disk until the solid portions of the rim 156 of the spinner are axially in alignment with the solid portions of the rim 162 of the disk. In this position, as shown in FIG. 5, the spinner 140 is prevented from separating axially from the disk 114.

The annular rim 156 is connected to the spinner by a wall 174 that is substantially cylindrical and that is of relatively small radial thickness so as to be capable of deforming, as described in greater detail below. The radial thickness 175 of this wall 174 lies in the range 2 millimeters (mm) to 4 mm, approximately.

Substantially radial notches 172 are also formed in the rim 156 of the spinner, in the bottoms of the gap portions 172, so as to increase the capacity of the solid portions to deform in bending, this also being described in greater detail below.

In the example shown, the inter-blade platforms 116 are secured to the disk 114 and to the downstream end of the spinner 140 and the outer periphery of the web 150.

Each platform 116 has three radially-inner rims 176, 178, and 180, respectively an upstream rim, and intermediate rim, and a downstream rim. The intermediate and downstream rims 178 and 180 extend axially downstream and they are engaged in annular grooves opening out axially upstream and located in the disk 114 and in the web 150, respectively. The upstream rim 176 of each platform 116 extends axially upstream and is engaged in an annular groove 182 that opens out axially downstream in the downstream end of the spinner 160. In this example, the annular groove 182 of the spinner is defined internally by the deformable wall 174 supporting the annular rim 156.

At its upstream end, the spinner 140 also has a radial wall 184 for fastening to an upstream annular flange of an intermediate shroud 186 having a downstream annular flange fastened to a corresponding annular flange 188 of the disk 114.

The wall 184 of the spinner 140, and the flanges of the shroud 186 and of the disk include at least two axial orifices that are in mutual alignment for passing screws 190 for holding the spinner angularly. In this fastened position, residual axial clearance J remains between the rims 156 and 162 of the spinner and of the disk (FIG. 4).

In the example shown, the wall 184 of the spinner has two orifices 192 of this type. The screws 190 fastening the wall 184 of the spinner serve to prevent the spinner from turning about the axis of the fan relative to the disk, and thus prevent the solid portions of the rim 156 of the spinner from coming out of alignment with the solid portions of the rim 162 of the disk. The intermediate shroud 186 may also be used for fastening flyweights for the purpose of balancing any unbalance of the fan rotor.

In a variant that is not shown, the wall 184 of the spinner may be pressed directly against the upstream flange 188 of the disk 114 and fastened thereto. For this purpose, the upstream flange 188 of the disk may be advanced axially towards the wall 184 of the spinner, and/or the wall 184 of the spinner may be moved axially rearwards towards the diffuser 188 of the disk 114.

In the event of a fan blade 112 being lost or broken, the blade strikes an adjacent blade, which is then thrust violently axially upstream so as to apply a large axial force on the rim 156 of the spinner. This rim 156 is designed to damp a portion of this force by deforming during two successive steps (referred to as double flexibility).

During the first step, the blade bears axially against the downstream radial face of the rim 156, its internal periphery then bending upstream (arrow 194 in FIG. 4). This bending gives rise to deformation of the wall 174 that is made possible by the axial clearance J. The bending of the inner periphery of the rim 156 takes place about an axis that is substantially tangential to a circumference centered on the axis of the fan, until it comes to bear axially against the rim 162 of the disk. During the second step, the rim 156 of the spinner is subjected to a different bending movement (arrow 196), which gives rise to a small upstream axial offset of the outer periphery of the rim 156. This bending is made possible by the deformation of the solid portions 164 of the rim 156 when they bear axially at their radially inner ends against the solid portions 168 of the rim 162 of the disk. The above-described bending can be localized in a particular zone of the rim situated in register with the lost or broken blade, or it may extend all around the periphery of the spinner.

What is claimed is:

1. A fan rotor for a turbomachine, the rotor comprising a disk carrying blades having roots that are engaged in substantially axial grooves in the outer periphery of the disk, and a substantially frustoconical annular spinner mounted by jaw-clutching on the disk, upstream from the blades, the spinner having a substantially radial inner annular rim that is scalloped or crenellated and that comprises solid portions alternating with gap portions and that, in the assembled position, is received in an outer annular groove of the disk that is defined upstream by a substantially radial outer annular rim that is scalloped or crenellated, wherein the inner annular rim of the spinner is connected at its outer periphery to a substantially cylindrical wall that is designed to deform in the event of a fan blade being broken or lost, and wherein the gap portions in the inner annular rim of the spinner include substantially radial notches for increasing the flexibility in bending of the solid portions of said annular rim.

2. A rotor according to claim 1, wherein, in the assembled position, residual axial clearance exists between the annular rims of the disk and of the spinner so as to allow the cylindrical wall of the spinner to deform.

3. A rotor according to claim 1, including inter-blade platforms mounted on the disk between the blades, each platform including an upstream rim engaged in an annular groove of the spinner and opening out substantially axially in a downstream direction.

4. A rotor according to claim 1, wherein the spinner has a radial wall including orifices for passing screws for fastening to an annular flange of the disk or on an annular flange of an intermediate shroud fitted on the disk and fastened thereto.

5. A rotor according to claim 4, wherein the radial wall of the spinner is formed on an upstream end portion of the spinner.

6. A turbomachine, including a fan rotor according to claim 1.

7. A test engine, including a fan rotor according to claim 1.

8. A substantially frustoconical annular spinner for a fan rotor according to claim 1, wherein the spinner includes a radial wall at its upstream end and an internal annular rim at its downstream end, the annular rim being scalloped or crenellated, comprising solid portions alternating with gap portions presenting substantially radial notches or recesses, the annular rim being connected to the spinner by a substantially cylindrical wall that is deformable.

9. A spinner according to claim 8, including an annular groove at its downstream end, the groove opening out axially away from its radial wall.

* * * * *

UNITED STATES PATENT AND TRADEMARK OFFICE
CERTIFICATE OF CORRECTION

| | |
|---|---|
| PATENT NO. | : 8,092,183 B2 |
| APPLICATION NO. | : 12/427343 |
| DATED | : January 10, 2012 |
| INVENTOR(S) | : Muriel Jane Sylvie Borzakian et al. |

It is certified that error appears in the above-identified patent and that said Letters Patent is hereby corrected as shown below:

On the title page, item (75) Inventors, please change "Muriel Jane Sylvie Borzakian, Saint German les Corbeil (FR)" to -- Muriel Jane Sylvie Borzakian, Saint Germain les Corbeil (FR) --

Signed and Sealed this
Third Day of April, 2012

David J. Kappos
*Director of the United States Patent and Trademark Office*